(12) United States Patent
Ryszkiewicz

(10) Patent No.: US 7,191,538 B1
(45) Date of Patent: Mar. 20, 2007

(54) TEMPLET SYSTEM FOR CUTTING OPENINGS IN LATH AND PLASTER PANELS

(76) Inventor: Leonard Ryszkiewicz, 27 Clifton St., Central Falls, RI (US) 02863

( * ) Notice: Subject to any disclaimer, the term of this patent is extended or adjusted under 35 U.S.C. 154(b) by 69 days.

(21) Appl. No.: 11/186,230

(22) Filed: Jul. 21, 2005

(51) Int. Cl.
G01B 1/00 (2006.01)
G01B 5/00 (2006.01)

(52) U.S. Cl. .................. 33/528; 33/DIG. 10; 33/562
(58) Field of Classification Search .............. 33/528, 33/DIG. 10, 562–566, 381–382
See application file for complete search history.

(56) References Cited

U.S. PATENT DOCUMENTS

| | | | |
|---|---|---|---|
| 3,745,664 A | 7/1973 | Altseimer | |
| 3,913,235 A | 10/1975 | Tenneson et al. | |
| 4,359,302 A * | 11/1982 | Payne | 33/DIG. 10 |
| 4,589,211 A | 5/1986 | Policka | |
| D298,421 S | 11/1988 | Tyroff | |
| 5,860,219 A | 1/1999 | Wilkinson | |
| 6,434,848 B1 | 8/2002 | Gordon et al. | |
| 6,810,598 B2 * | 11/2004 | Boys | 33/528 |
| 6,842,993 B1 * | 1/2005 | DiMauro | 33/528 |
| 6,870,100 B2 * | 3/2005 | Corwin | 33/DIG. 10 |

* cited by examiner

Primary Examiner—Yaritza Guadalupe-McCall
(74) Attorney, Agent, or Firm—Sturm & Fix LLP

(57) ABSTRACT

The present invention provides a templet system including a drilling templet, a sawing templet, and a fastener with an expandable toggle nut to secure the sawing templet to a lath and plaster ceiling or wall panel during the cutting process, and to secure the cut portion of the panel to the sawing templet for removal from the remainder of the panel. The opening formed by removal of the cut portion of the panel is sized to receive an electrical box of a desired shape—either rectangular or octagonal. The templet system allows the lath and plaster panel to be cut without damage to the panel in the area adjacent the cut opening.

20 Claims, 4 Drawing Sheets

TEMPLET SYSTEM FOR CUTTING OPENINGS IN LATH AND PLASTER PANELS

BACKGROUND OF THE INVENTION

1. Field of the Invention

The present invention relates to the field of hand tool accessories, and more particularly to a templet system for cutting openings in lath and plaster ceiling or wall panels for installation of electrical outlet boxes.

2. Description of Related Art

As can be seen by reference to the following U.S. Pat. Nos. 3,745,664; 3,913,235; 4,589,211; 5,860,219; 6,434,848, and D298,421, the prior art is replete with myriad and diverse tool accessories.

While all of the aforementioned prior art constructions are more than adequate for the basic purpose and function for which they have been specifically designed, they are uniformly deficient with respect to their failure to provide a simple, efficient, and practical templet system for cutting electrical outlet box openings in old work lath and plaster ceiling and wall panels without causing damage to the panels adjacent the cut opening.

As a consequence of the foregoing situation, there has existed a longstanding need for a new and improved templet system, and the provision of such a construction is a stated objective of the present invention.

BRIEF SUMMARY OF THE INVENTION

Briefly stated, the present invention provides a templet system including a drilling templet, a sawing templet, and a fastener with an expandable toggle nut to secure the sawing templet to a lath and plaster ceiling or wall panel during the cutting process, and to secure the cut portion of the panel to the sawing templet for removal from the remainder of the panel. The opening formed by removal of the cut portion of the panel is sized to receive an electrical box of a desired shape—either rectangular or octagonal. The templet system allows the lath and plaster panel to be cut without damage to the panel in the area adjacent the cut opening.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
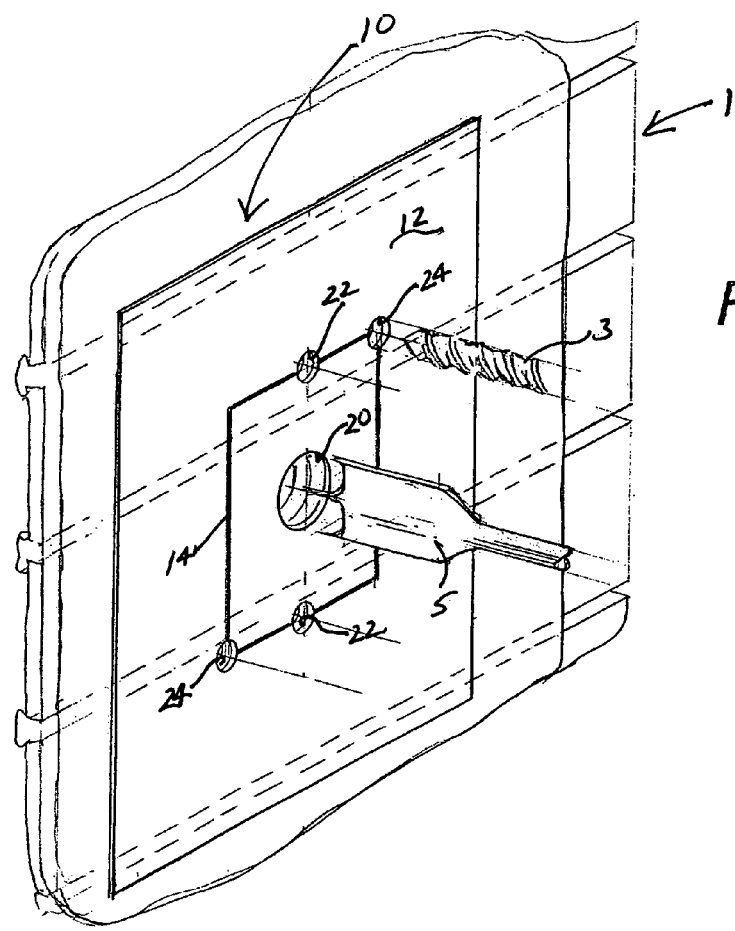
FIG. 1 is a perspective view of the drilling templet for a rectangular electrical outlet box in position on a lath and plaster wall panel.
Figure 2:
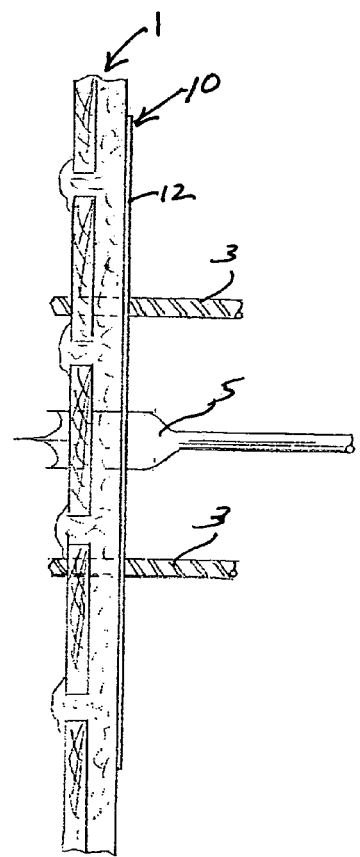
FIG. 2 is a side elevation sectional view of the drilling templet illustrating the central opening, the saw blade openings, and the failure point openings being drilled through the panel.
Figure 3:
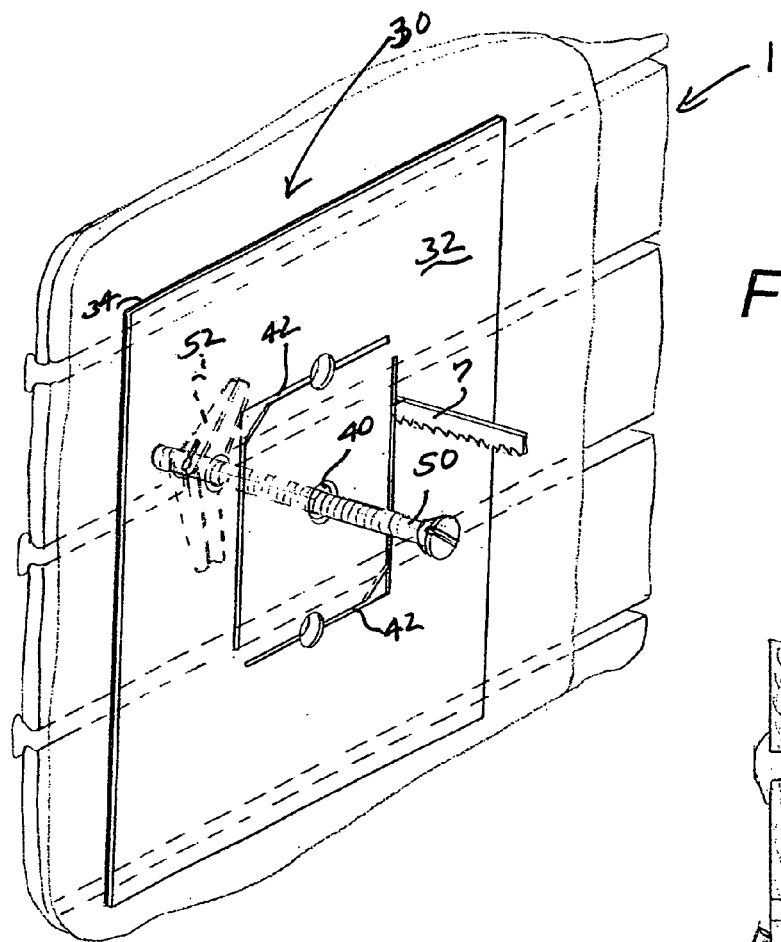
FIG. 3 is a perspective view of the sawing templet for the rectangular outlet box secured to the panel by a fastener bolt and an expandable toggle nut.
Figure 4:
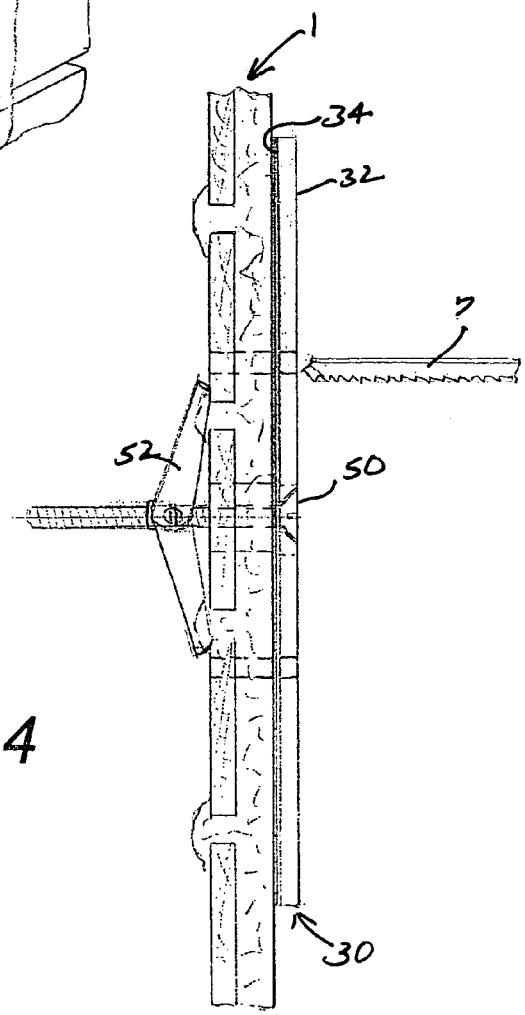
FIG. 4 is a side elevation sectional view of the sawing templet illustrating the saber saw blade being received through the saw blade opening to allow sawing along the saw blade guide slots that follow the peripheral outline of the electrical outlet box.
Figure 5:
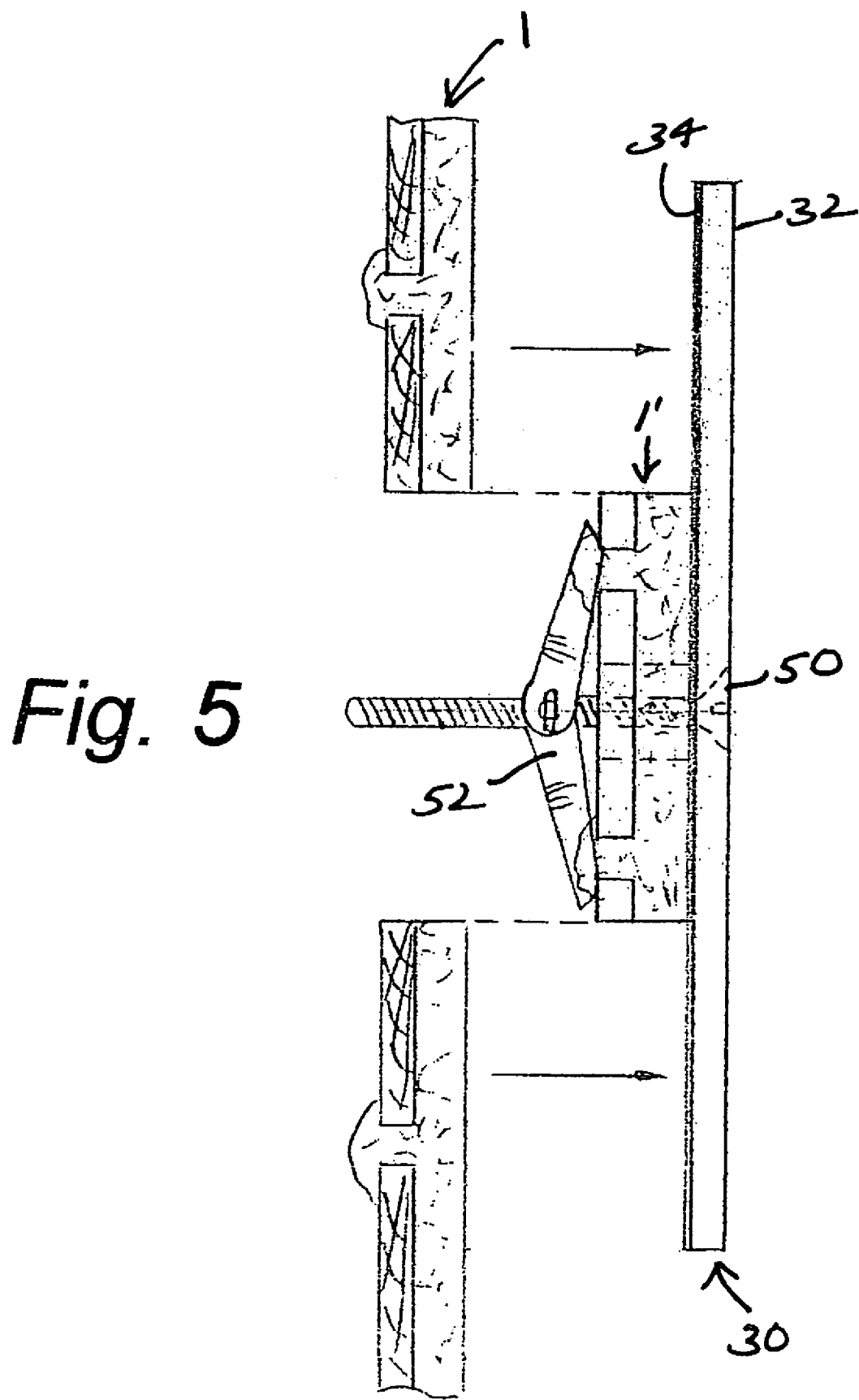
FIG. 5 is a side elevational sectional view of the sawing templet illustrating the removal of the sawed portion of the panel from the remainder of the panel.

As can be seen by reference to the drawings, and in particular to FIGS. 1 and 3, the templet system that forms the basis of the present invention includes a drilling templet 10 (FIGS. 1 and 2), and a sawing templet 30 (FIGS. 3–5.) The templet system is used for cutting an opening in a lath and plaster ceiling or wall panel 1. The drilling templet 10 includes a planar body member 12 that carries markings 14 that indicate the peripheral outline of a rectangular electrical outlet box. The drilling templet 10 also has a central opening 20, pair of saw blade openings 22, and a pair of failure point openings 24 formed therethrough.

The drilling templet 10 is positioned on the ceiling or wall panel 1 and squared or leveled at the point where an electrical outlet box is to be installed. Holes are then drilled through the panel at the position of the templet openings 20, 22, and 24 by drill bits 3 and 5.

The sawing templet 30 includes a planar body member 32 with a central fastener opening 40 and saw blade slots 42. A fastener bolt 50 is inserted through the opening 40 and an expandable toggle nut 52 is attached. The toggle nut 52 is then inserted into the hole drilled through the panel 1 at the position of the central opening 20 of the drilling templet 10 so that it engages the interior surface of the panel. The fastener bolt 50 is then tightened to secure the sawing templet 30 to the panel 1. An anti-slip tape 34 is attached to the back of the sawing templet 30 to reduce vibration and prevent the panel 1 from being marked or scratched.

When the sawing templet 30 is secured to the panel 1, a jigsaw blade 7 is inserted through the hole drilled through the panel 1 at the position of the saw blade openings 22 of the drilling templet 10. The panel 1 is then sawed along the saw blade guide slots 42 that extend around the entire peripheral outline of the electrical box except for points immediately adjacent the holes drilled through the panel 1 at the position of the failure point openings 24 of the drilling templet 10. The sawing templet 30 can then be removed from the panel 1 along with the cut portion of the panel 1' as illustrated in FIG. 5.

Figure 6:
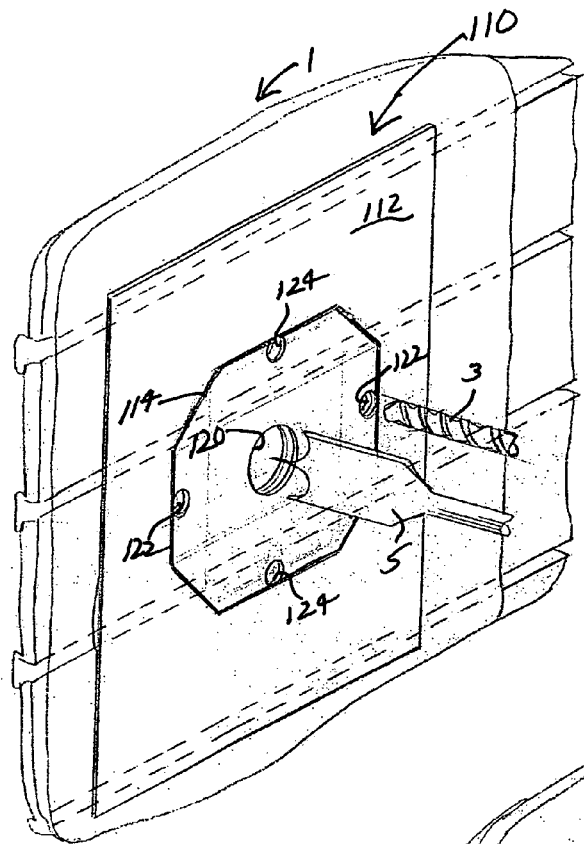
FIG. 6 is a perspective view of a drilling templet used for the installation of octagonal outlet boxes.
Figure 7:
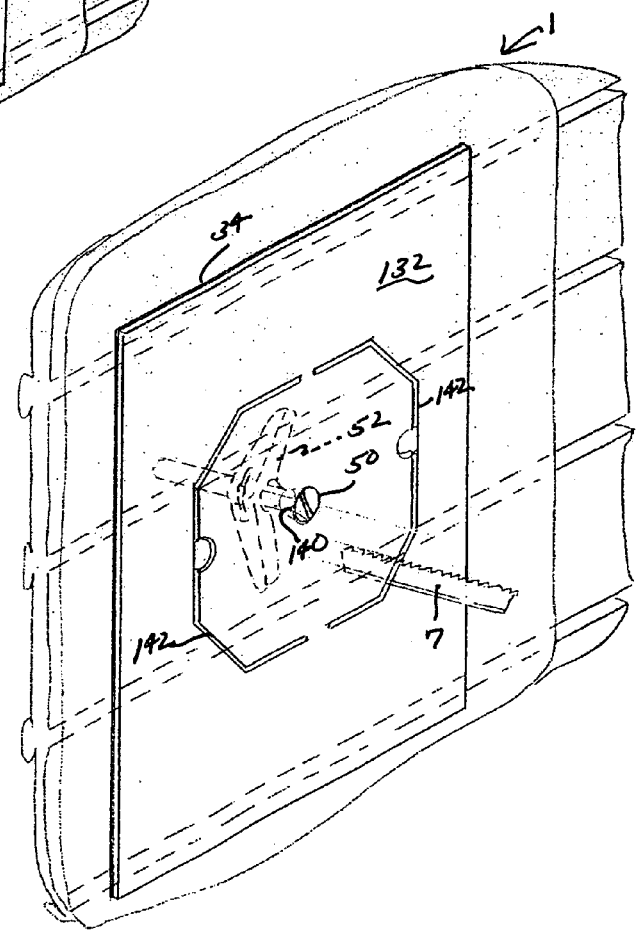
FIG. 7 is a perspective view of the sawing templet for octagonal outlet boxes.

The templet system of the present invention is suitable for cutting openings in panels 1 for octagonal electrical boxes is illustrated in FIGS. 6 and 7. The drilling templet 110 has a planar body member 112 with octagonal markings 114, a central opening 120, a pair of saw blade openings 122, and a pair of failure point openings 124. The sawing templet 130 has a planar body member 132, a central fastener opening 140 and saw blade slots 142. This templet system is used as described for the templet system illustrated in FIGS. 1–5 and results in an octagonally shaped opening being cut in the panel 1 to accommodate an octagonal electrical box. The templet systems allow openings to be put in old work lath and plaster panels 1 without damaging the panels 1 in the area adjacent the cut opening.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A method of cutting an opening in a lath and plaster ceiling or wall panel for an electrical box having a configuration with a predetermined peripheral outline, the method comprising the steps of:

provided a drilling templet having a planar body member extending beyond the peripheral outline, a central opening extending through the body member within the outline, a saw blade opening extending through the body member and being aligned with the peripheral outline, and a failure point opening extending through the body member and being aligned with the peripheral outline at a point spaced from the saw blade opening;

positioning the drilling templet on the panel;

drilling through the panel at positions of the central opening, saw blade opening, and failure point opening;

providing a sawing templet having a planar body member extending beyond the peripheral outline, a central fastener opening extending through the body member, and a saw blade guide slot extending through the body member and being aligned with and extending around the entire peripheral outline except for points of the outline immediately adjacent to the failure point opening;

inserting a fastener through the central fastener opening in the sawing templet and attaching an expandable toggle nut to the fastener;

inserting the toggle nut into an opening in the panel formed by drilling through the panel at the position of the central opening;

tightening the fastener to attach the sawing templet to the panel with the sawing templet on one side of the panel and the toggle nut on another side of the panel;

sawing through the panel along the saw blade guide slot; and removing the sawing templet along with a cut portion of the panel.

2. The method of claim 1 wherein the peripheral outline is rectangular.

3. The method of claim 2 wherein the planar body of the drilling templet carries markings indicating the peripheral outline.

4. The method of claim 1 wherein the peripheral outline is octagonal.

5. The method of claim 4 wherein the planar body of the drilling templet carries markings indicating the peripheral outline.

6. The method of claim 1 wherein the planar body of the drilling templet carries markings indicating the peripheral outline.

7. The method of claim 1 wherein the drilling templet has a pair of saw blade openings.

8. The method of claim 7 wherein the drilling templet has a pair of failure point openings.

9. The method of claim 8 wherein the sawing templet has a pair of saw blade guide slots, each of the saw blade guide slots being aligned with and extending around the peripheral outline between the pair of failure point openings.

10. The method of claim 1 wherein the drilling templet has a pair of failure point openings.

11. A templet system to cut an opening in a lath and plaster ceiling or wall panel for installation of an electrical box having a configuration with a predetermined peripheral outline, the templet system comprising:

a drilling templet having a planar body member extending beyond the peripheral outline, a central opening extending through the body member within the outline, a saw blade opening extending through the body member and being aligned with the peripheral outline, and a failure point opening extending through the body member and being aligned with the peripheral outline at a point spaced from the saw blade opening;

a sawing templet having a planar body member extending beyond the peripheral outline, a central fastener opening extending through the body member, and a saw blade guide slot extending through the body member and being aligned with and extending around the entire peripheral outline except for points of the outline immediately adjacent to the failure point opening;

a fastener received in the central opening of the sawing templet; and an expandable toggle nut attached to the fastener and being received through an opening in the panel formed at the position of the central opening of the sawing templet.

12. The templet system of claim 11 wherein the peripheral outline is rectangular.

13. The templet system of claim 12 wherein the planar body of the drilling templet carries markings indicating the peripheral outline.

14. The templet system of claim 11 wherein the peripheral outline is octagonal.

15. The templet system of claim 14 wherein the planar body of the drilling templet carries markings indicating the peripheral outline.

16. The templet system of claim 11 wherein the planar body of the drilling templet carries markings indicating the peripheral outline.

17. The templet system of claim 11 wherein the drilling templet has a pair of saw blade openings.

18. The templet system of claim 17 wherein the drilling templet has a pair of failure point openings.

19. The templet system of claim 18 wherein the sawing templet has a pair of saw blade guide slots, each of the saw blade guide slots being aligned with and extending around the peripheral outline between the pair of failure point openings.

20. The templet system of claim 11 wherein the drilling templet has a pair of failure point openings.

* * * * *